(12) United States Patent
Randall et al.

(10) Patent No.: US 7,707,110 B2
(45) Date of Patent: Apr. 27, 2010

(54) SYSTEM AND METHOD FOR CONDUCTING TRANSACTIONS WITH DIFFERENT FORMS OF PAYMENT

(75) Inventors: Steve Randall, Austin, TX (US);
Colleen George, Centennial, CO (US)

(73) Assignee: First Data Corporation, Greenwood Village, CO (US)

( * ) Notice: Subject to any disclaimer, the term of this patent is extended or adjusted under 35 U.S.C. 154(b) by 1536 days.

(21) Appl. No.: 10/839,769

(22) Filed: May 4, 2004

(65) Prior Publication Data

US 2005/0261968 A1    Nov. 24, 2005

(51) Int. Cl.
  G06Q 40/00   (2006.01)
  G06Q 10/00   (2006.01)
  G06Q 20/00   (2006.01)
  G06Q 1/10    (2006.01)
  G06K 5/00    (2006.01)
  G06K 7/08    (2006.01)

(52) U.S. Cl. .................. 705/40; 705/2; 705/4; 705/16; 705/17; 705/25; 705/35; 235/380; 235/381

(58) Field of Classification Search ............... 705/1, 705/35, 39, 40, 14, 26, 50, 64, 77, 79, 4
See application file for complete search history.

(56) References Cited

U.S. PATENT DOCUMENTS

| | | |
|---|---|---|
| 3,599,151 A | 8/1971 | Harr |
| 3,833,395 A | 9/1974 | Gosnell |
| 4,321,672 A | 3/1982 | Braun et al. |
| 4,562,340 A | 12/1985 | Tateisi et al. |
| 4,562,341 A | 12/1985 | Ohmae et al. |
| 4,630,200 A | 12/1986 | Ohmae et al. |

(Continued)

FOREIGN PATENT DOCUMENTS

EP    0481135 A1    4/1992

(Continued)

OTHER PUBLICATIONS

Website: "Tranz 330 Fast, Low-Cost Transaction Automation At the Point of Service" Verifone Finance, Jan 1999, pp. 1-3, at [http://www.vfi-finance.com/tranz330.htm].

(Continued)

*Primary Examiner*—F. Zeender
*Assistant Examiner*—Hajime Rojas
(74) *Attorney, Agent, or Firm*—Townsend and Townsend and Crew LLP

(57) ABSTRACT

A system and method for the purchase of products, where some products may eligible for special forms of payment, such as payment from a medical savings account (MSA). A POS terminal is used to obtain a product ID (from a product bar code) and an MSA account ID from an MSA account card. The product and account IDs are provided to a database where MSA eligibility and MSA account status information is accessed and retrieved. A display at the POS terminal separates and displays information on both the eligible and non-eligible products. The POS terminal may used to pay for eligible products by electronically debiting the MSA account, and to pay for non-eligible products by traditional methods, such as cash, check or credit card. Eligible products may be given price discounts, and discount information is also retrieved from the database.

23 Claims, 5 Drawing Sheets

```
                REGULAR PURCHASES
                                            310
                CANDY        $1.59    320
                SCHOOL ITEMS $3.49
                TOOTH PASTE  $2.19
                BEVERAGE     $ .99
             332  TOTAL      $8.26

ELIGIBLE MEDICAL PURCHASES
                                         322
           346      ASPIRIN    $1.99
                    MEMBER PRICE  $1.59

348      ANTACID    $3.99
                    MEMBER PRICE  $2.99
           334
                ELIGIBLE TOTAL    $4.58

340  PAY FROM MEDICAL ACCOUNT? (Y/N)
```

U.S. PATENT DOCUMENTS

| Patent | Date | Inventor |
|---|---|---|
| 4,678,895 A | 7/1987 | Tateisi et al. |
| 4,722,554 A | 2/1988 | Pettit |
| 4,812,628 A | 3/1989 | Boston et al. |
| 4,961,142 A | 10/1990 | Elliott et al. |
| 5,119,293 A | 6/1992 | Hammond |
| 5,175,682 A | 12/1992 | Higashiyama et al. |
| 5,220,501 A | 6/1993 | Lawlor et al. |
| 5,367,452 A | 11/1994 | Gallery et al. |
| 5,408,077 A | 4/1995 | Campo et al. |
| 5,426,594 A | 6/1995 | Wright et al. |
| 5,464,971 A | 11/1995 | Sutcliffe et al. |
| 5,484,988 A | 1/1996 | Hills et al. |
| 5,491,325 A | 2/1996 | Huang et al. |
| 5,504,677 A | 4/1996 | Pollin |
| 5,510,979 A | 4/1996 | Moderi et al. |
| 5,555,496 A | 9/1996 | Tackbary et al. |
| 5,577,109 A | 11/1996 | Stimson et al. |
| 5,622,388 A | 4/1997 | Alcordo |
| 5,630,071 A * | 5/1997 | Sakai et al. ............... 705/21 |
| 5,657,201 A | 8/1997 | Kochis |
| 5,677,955 A | 10/1997 | Doggett et al. |
| 5,679,940 A | 10/1997 | Templeton et al. |
| 5,699,528 A | 12/1997 | Hogan |
| 5,757,917 A | 5/1998 | Rose et al. |
| 5,794,207 A | 8/1998 | Walker et al. |
| 5,815,657 A | 9/1998 | Williams et al. |
| 5,826,241 A | 10/1998 | Stein et al. |
| 5,828,875 A | 10/1998 | Halvarsson et al. |
| 5,832,463 A | 11/1998 | Funk |
| 5,893,080 A | 4/1999 | McGurl et al. |
| 5,910,988 A | 6/1999 | Ballard |
| 5,949,044 A | 9/1999 | Walker et al. |
| 5,960,412 A | 9/1999 | Tackbary et al. |
| 5,987,426 A | 11/1999 | Goodwin, III |
| 6,029,150 A | 2/2000 | Kravitz |
| 6,030,000 A | 2/2000 | Diamond |
| 6,032,133 A | 2/2000 | Hilt et al. |
| 6,032,137 A | 2/2000 | Ballard |
| 6,039,245 A | 3/2000 | Symonds et al. |
| 6,058,417 A | 5/2000 | Hess et al. |
| 6,064,990 A | 5/2000 | Goldsmith |
| 6,070,798 A | 6/2000 | Nethery |
| 6,097,834 A | 8/2000 | Krouse et al. |
| 6,106,020 A | 8/2000 | Leef et al. |
| 6,119,106 A | 9/2000 | Mersky et al. |
| 6,122,625 A | 9/2000 | Rosen |
| 6,164,528 A | 12/2000 | Hills et al. |
| 6,175,823 B1 | 1/2001 | Van Dusen |
| 6,193,152 B1 | 2/2001 | Fernando et al. |
| 6,199,761 B1 | 3/2001 | Drexler |
| 6,246,996 B1 | 6/2001 | Stein et al. |
| 6,305,604 B1 | 10/2001 | Ono |
| 6,308,887 B1 | 10/2001 | Korman et al. |
| 6,327,575 B1 | 12/2001 | Katz |
| 6,353,811 B1 * | 3/2002 | Weissman ............... 705/40 |
| 6,360,254 B1 | 3/2002 | Linden et al. |
| 6,367,693 B1 | 4/2002 | Novogrod |
| 6,484,936 B1 | 11/2002 | Nicoll et al. |
| 6,539,363 B1 | 3/2003 | Allgeier et al. |
| 6,547,132 B1 | 4/2003 | Templeton et al. |
| 7,213,750 B1 * | 5/2007 | Barnes et al. ............ 235/381 |
| 2001/0051876 A1 | 12/2001 | Seigel et al. |
| 2002/0153414 A1 | 10/2002 | Stoutenburg |
| 2002/0198831 A1 * | 12/2002 | Patricelli et al. .......... 705/40 |
| 2004/0064368 A1 * | 4/2004 | Koser et al. ............. 705/14 |

FOREIGN PATENT DOCUMENTS

| | | |
|---|---|---|
| EP | 0949596 A2 | 10/1999 |
| EP | 1077436 A2 | 2/2001 |
| WO | WO 00/46725 A1 | 8/2000 |
| WO | WO 00/67177 A2 | 11/2000 |
| WO | WO 01/04816 A1 | 1/2001 |
| WO | WO 02/05195 A1 | 1/2002 |

OTHER PUBLICATIONS

Business Wire, "E-Commerce, Email and E-greeting Cards Combine in New Web Site Designed by Interactive Bureau", Sep. 14, 1999 (abstract), [online] [retrieved on May 1, 2002], retrieved from Proquest Database, 2 pages.

PR Newswire, "GiftSpot.com Simplifies Gift-Giving on the Internet," Oct. 20, 1999 (abstract), [online] [retrieved on May 1, 2002], retrieved from PROQUEST Database, 3 pages.

x.com, "Do More with Your Money", downloaded from website http://www.x.com., Feb. 7, 2000, 5 pages.

Dotbank, "The Way to Send and Receive Money on the Internet", downloaded from website http://www.dotbank.com, Feb. 7, 2000, 7 pages.

Idealab Company, PayMe.com, downloaded from website http://ssl.idealab.com on Feb. 16, 2000, 6 pages.

Confinity, Inc., PayPal.com, "How PayPal.com Works", downloaded from website http://www.paypal.com on Feb. 7, 2000, 5 pages.

* cited by examiner

REGULAR PURCHASES

| | | |
|---|---|---|
| CANDY | $1.59 | |
| SCHOOL ITEMS | $3.49 | ← 320 |
| TOOTH PASTE | $2.19 | |
| BEVERAGE | $ .99 | |

332 — TOTAL  $8.26

ELIGIBLE MEDICAL PURCHASES

346  ASPIRIN  $1.99  ← 322
— MEMBER PRICE  $1.59

348  ANTACID  $3.99
— MEMBER PRICE  $2.99

334 — ELIGIBLE TOTAL  $4.58

340 — PAY FROM MEDICAL ACCOUNT? (Y/N)

| MEMBER | | |
|---|---|---|
| ACCT ID | BAL | OTHER |
| 1234567 | 2000.00 | X X X |
| 1234568 | 336.25 | X X X |
| 1234569 | 254.01 | X X X |
| . | . | . |
| . | . | . |
| . | . | . |

410

412

| PRODUCT | | | |
|---|---|---|---|
| PRODUCT ID | DISCOUNT Y/N | % | OTHER |
| 8475238 | y | 5 | X X X |
| 8475329 | y | 10 | X X X |
| 84735240 | n | 0 | X X X |
| . | . | . | . |
| . | . | . | . |
| . | . | . | . |

FIG. 4

SYSTEM AND METHOD FOR CONDUCTING TRANSACTIONS WITH DIFFERENT FORMS OF PAYMENT

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

Not Applicable

BACKGROUND OF THE INVENTION

Healthcare costs have become a significant issue for consumers. One approach to addressing the issue had been the creation of Medical Savings Accounts or MSAs (sometimes also referred to as Flexible Spending Accounts or Healthcare Spending Accounts) for members of a group (such as employees under an employer healthcare plan). Such accounts permit a member to contribute money (usually on a pre-tax basis) and thereafter obtain reimbursement from the account for various medical or other eligible expenses.

The administrative burden in managing an MSA plan can be high. As an example, a reimbursement form is typically completed by the member and submitted to the plan administrator. The administrator determines the eligibility of the member, the current balance in the member's account, and the eligibility of products or services purchased. If the purchase is eligible, a reimbursement is made to the member. Given the multiple steps involved, significant time and cost are required for each transaction.

The Internal Revenue Code and regulations issued thereunder govern most aspects of MSAs, including products and services eligible for reimbursement. Systems have been developed to permit the use of debit cards, so that a member can obtain reimbursement (and pay a medical services provider directly) from the account at the time of purchase. The debit card is used at a POS or medical provider terminal to access the member's account, and if there is a sufficient balance in the account, to pay for the product or service at the time of purchase by debiting the account.

However, many products eligible for reimbursement, such as over-the-counter (OTC) medicines, are available at drugstores, pharmacies, grocery stores, and other retail establishments, and neither the member purchasing the product nor the retail clerk handling the transaction are familiar with rules that govern eligibility. As a results, members often do not obtain reimbursement for products that would otherwise be eligible when purchased.

BRIEF SUMMARY OF THE INVENTION

There is provided, in accordance with embodiments of the present invention, a system, method and display for conducting/settling transactions involving items, wherein the items may be subject to different forms of payment treatment.

In some embodiments, a method is provided for settling a transaction involving the purchase of products, wherein different products may be subject to different forms of payment treatment, the method comprising receiving product information at a data system, using product information to retrieve payment treatment information for the product at the data system, and purchasing the product based on its payment treatment.

In other embodiments, there is provided a system for conducting sales transaction for items at a merchant location, wherein different products may be eligible for different forms of payment, and wherein the system includes a POS terminal at the merchant location for obtaining product information on each product being sold, and a data system for receiving the product information and determining the payment form for which the product may be eligible. The payment form is then used at the POS terminal to facilitate the sale of the products. In one illustrated embodiment, one form of payment is payment from a debit account, such as a medical savings account (MSA).

In yet other embodiments, there is provided a display in a system for purchasing products at a merchant location, comprising a first display component for displaying information relating to one or more products associated with one form of payment treatment, a second display component for displaying information relating to one or more products associated with a different form of payment treatment, and an input element associated with at least one of the first and second display components for initiating payment for the products in that display component in accordance with associated payment treatment.

A more complete understanding of the present invention may be derived by referring to the detailed description of the invention and to the claims, when considered in connection with the Figures.

BRIEF DESCRIPTION OF THE DRAWINGS

FIG. 3 illustrates a screen display at one of the POS terminals in the system of FIG. 1.

FIG. 4 illustrates database tables used in the system of FIG. 1.

DETAILED DESCRIPTION OF THE INVENTION

Figure 1:
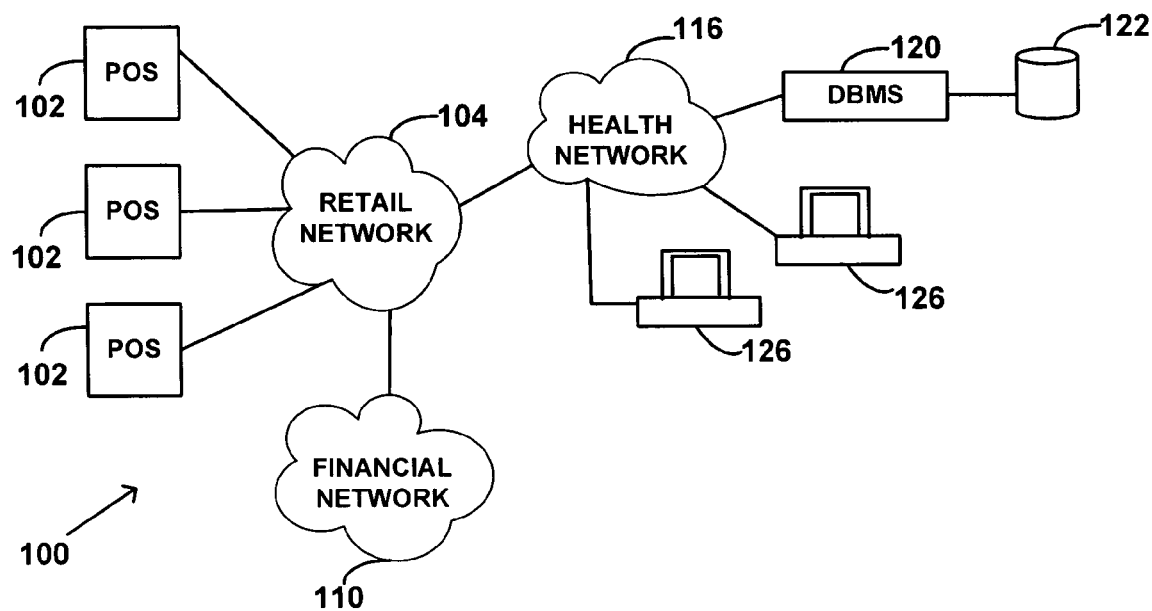
FIG. 1 is a general schematic diagram showing a system for facilitating MSA payments, in accordance with one embodiment of the invention.

There are various embodiments and configurations for implementing the present invention. On such implementation is shown in FIG. 1, where according to one embodiment of the invention, a system 100 includes a plurality of point-of-sale (POS) terminals 102 connected to a retail network 104. The network 104 is of a well known type, wherein the POS terminals 102 may be located at one (or more) retail establishments (pharmacies, drug stores, grocery stores, etc.). The POS terminals have price look-up and other functionality, either internally or through interconnection to a server or database (not shown) within the retail network 104. The retail network may also be connected to a banking or financial network 110 in order to handle credit card and other electronic transactions passing through the retail network 104, e.g., originating at POS terminals 102. Further, the retail network 104 may also be connected to a health account network 116, which is maintained by an MSA plan administrator and through which MSA accounts are accessed and used.

Terminals (such as the POS terminals 102) used for conducting retail and similar transactions are well known. Although not illustrated in FIG. 1, such terminals may include a keyboard, a display and various peripheral devices or functions (e.g., magnetic stripe card reader, optical bar code reader, etc.) well know to those skilled in the art. As should also be appreciated, the POS terminals may be operated by a retail clerk when products to be purchased are presented by a customer at a checkout line, or could be self-service terminals used by the customer, without intervention by a retail clerk (e.g., at a checkout station, built into a shopping basket, or located elsewhere within a retail establishment).

When products are taken by a customer to the POS terminal 102, product information or a product ID is entered (e.g., at a keyboard or through use of a bar code scanner). Product information is used to retrieve pricing information (e.g., at a price look-up table within the POS terminal or in a database elsewhere within the retail network 104). The customer may use cash or a financial card (e.g., credit card or debit card), and in the case of a card, information may be read at the POS terminal (e.g., at a magnetic stripe reader) and transmitted to a bank or financial institution through financial network 110 in order to authorize the transaction and post it to the appropriate account. The card may be presented at any time during the transaction (before, during or after) product IDs are entered. POS devices and networks for conducting credit card and similar transactions are known and can be found in co-pending, commonly assigned U.S. patent application Ser. No. 10/116,689, entitled "SYSTEMS AND METHODS FOR PERFORMING TRANSACTIONS AT A POINT-OF-SALE," filed Apr. 3, 2002, by Earney Stoutenburg, et al., which is a continuation-in-part of U.S. patent application Ser. No. 09/634,901, entitled "POINT OF SALE PAYMENT TERMINAL," filed Aug. 9, 2000, by Randy J. Templeton et al. Further, such devices and terminals used in connection with health insurance plans and MSA accounts are found in co-pending, commonly assigned U.S. patent application Ser. No. 10/675,929, entitled "SYSTEMS AND METHODS FOR VERIFYING MEDICAL INSURANCE COVERAGE," filed Sep. 29, 2003, by Charles Whitaker, et al., and U.S. Provisional Pat. App. No. 60/515,918, entitled "HEALTH CARE ELIGIBILITY VERIFICATION SYSTEMS AND METHODS," filed Oct. 29, 2003, by Judi Gabel et al. The entire disclosures of the referenced patent applications are hereby incorporated by reference.

The health network 116 is used for processing information entered at the POS terminals 102 that pertain to insurance and MSA account administration. In particular, it is anticipated that a customer uses an MSA card (to be described later in conjunction with FIGS. 2A and 2B) to identify himself and the MSA account to which eligible purchases may be applied. Such information is entered (e.g., by reading a magnetic stripe on the MSA card at one of the POS terminals 102), and is communicated through the retail network 104 to the health network 116. The health network 116 links systems, terminals and databases operated by the MSA administrator, including a database management system or server (DBMS) 120 which manages an associated data store or database 122, and terminals 126. The database 122 stores data (to be described in greater detail later in conjunction with FIG. 4) which may, among other things, identify MSA members, account balances, and product IDs for MSA eligible products. The DBMS 120 and database 122 may include any one of numerous forms of storage devices and storage media, such as solid state memory (RAM, ROM, PROM, and the like), magnetic memory, such as disc drives, tape storage, and the like, and/or optical memory, such as DVD. The database 122 may be co-located with the DBMS 120, it may be integral with the DBMS 120, or it may represent (with DBMS 120) distributed data systems located remotely in various different systems and locations. The terminals 126 are workstations used, for example, by administrative staff when accessing the DBMS 120 and other systems connected to the network 116.

The networks 104, 110 and 116 may be implemented using the Internet, an intranet, a wide area network (WAN), a local area network (LAN), a virtual private network, or any combination of the foregoing. The networks may include both wired and wireless connections, including optical links. For example, the POS terminals may be portable wireless terminals (stationary or mobile) linked to the retail network 104 by wireless communications channels.

While each of the networks 104, 110 and 116 is illustrated in FIG. 1 as a separate network, all could in fact be a single, integrated network (maintained by a financial institution that both processes financial transactions from merchant locations and administers one or more MSA plans). Alternatively, the networks 104, 110 and 116, could each be multiple networks. For example, the financial network 110 could represent multiple bank networks connected to the retail network 104 so card transactions for accounts maintained at any one of several different banking or financial institutions may be processed. Also, the health network 116 could represent multiple health networks, each maintaining MSA plans for its own members and each connected to the retail network 104 for processing MSA transactions when one of its members presents an MSA card at one of the POS terminals 102.

Also, while the POS terminals 102, DBMS 120 and database 122 are illustrated as separate devices or systems geographically distributed across various networks, they (and their functionality) could all be collocated at a single location and could even all be integrated into a single computing system or device.

Figure 2A:
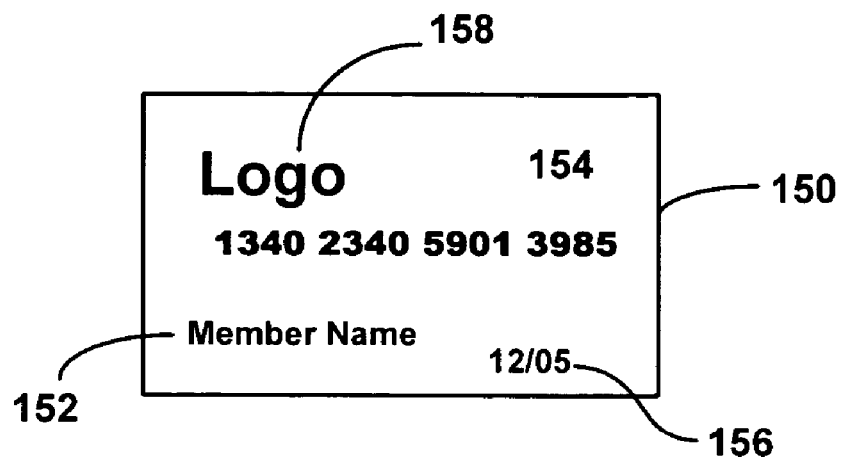
FIG. 2 illustrates an MSA debit card that could be used in conjunction with the system of FIG. 1.
Figure 2B:
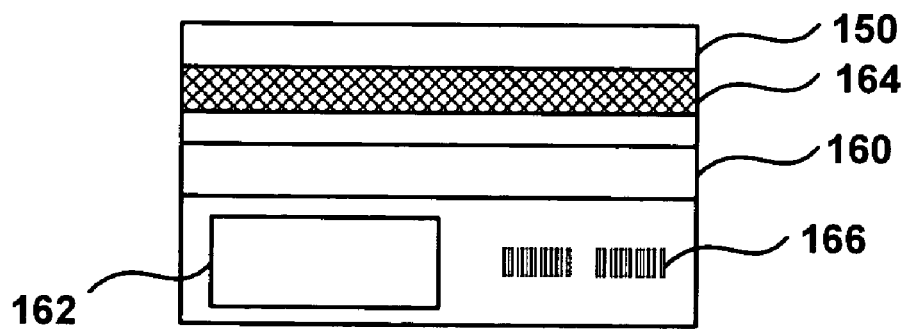

FIGS. 2A and 2B show the front and back sides, respectively, of a presentation instrument or MSA card 150 that could be used by a customer (e.g., as a debit card) when making purchases at one of the POS terminals 102, according to one embodiment of the invention. For purposes of the present description, it is assumed that the customer presents the card 150 after purchases have been brought to the POS terminal and each product ID number has been entered (e.g., by use of a keyboard or optical bar code reader). However, as mentioned earlier, the card may be presented at any time (e.g., before, during or after product ID's have been entered.)

The card 150 is used to identify the member (as someone covered under an MSA plan), and provide information to the POS terminal 102 in order to verify eligibility and/or settle transactions. One side of the card may be embossed with the member's name 152, an account number 154, and an expiration date 156. The card may have a logo 158 of the payer (MSA administrator). Additionally, the card may have other recognizable features that identify it as a branded financial card.

The back side of the card may include a signature line 160, and plan information 162. Plan information may include a group number, a plan administrator phone number, and other similar information. In some embodiments, the card 150 may also serve as an insurance card (as well as an MSA card) and could include information such as deductibles, co-payments, and the like.

The card also includes one or more information encoding features. Information encoding features may include a magnetic stripe 164, a bar code 166, a smart chip (not shown), and the like. It is to be understood that many other examples of a health care presentation instrument and associated information encoding features are possible.

In the illustrated embodiment, the MSA card number 154 identifies the institution maintaining the MSA account as well as the customer's individual MSA account. Similar to conventional credit or debit card transactions, such information is used by the POS terminal and retail network 104 to route the transaction data to the health network 116, where the MSA account or the customer is accessed (to be more fully described later).

The card 150 permits the customer to identify and purchase products that are eligible for MSA reimbursement or payment. Thus, after the product ID for each product to be purchased is entered at POS terminal 102, and after member information (MSA account number, etc.) is read from the MSA card at the POS terminal 102, such information is transmitted through retail network 104 and health network 116 to DBMS 120. The DBMS 120 accesses database tables in database 122 that have the member's MSA account information and also information concerning eligible products. The customer is then informed at the POS terminal 102 whether individual purchases are eligible for MSA payment and whether there are sufficient moneys in the MSA account to pay for eligible purchases. The customers is then asked whether such eligible purchases are to be paid for using the MSA account as a debit account (i.e., debiting purchases against the balance in the account).

FIG. 3 illustrates a screen 310 that could be displayed at one of the POS terminals 102. The screen 310 facilitates the purchase of MSA eligible products by displaying eligible products separately from non-eligible products, and permitting the customer to have purchases made (debited) against the MSA account. As seen in FIG. 3, various products have been presented (and their product IDs read) at the POS terminal 102. Those products and their prices are displayed. Further, the customer has presented an MSA card (such as the card 150 seen in FIG. 2), and the eligibility of products for MSA payment has been determined (the various steps for such determination will be described later). Thus in FIG. 3, the screen 310 displays the purchased products as either regular (non-eligible) purchases 320 or as eligible purchases 322. A regular purchase total 332 as well as a separate MSA eligible total 334 are displayed, and the customer (whose has been identified by accessing database 122 as a member of an MSA plan having a sufficient balance) is asked through use of the display (at display line 340) whether eligible products are to be debited against the MSA account. Upon selection for MSA payment (such as by use of a keyboard or a touch screen entry), the MSA account is debited and the customer is then responsible for payment (cash, check, credit card, etc.) of other, non-eligible items purchased. The payments from the MSA account to the retail establishment or merchant are handled in the same manner as a conventional debit card transaction, with the amount debited from the MSA account being electronically transferred through a clearing house network (e.g., financial network 110) and credited to the account of the merchant.

In addition to displaying the purchase amount for each eligible product, the screen 310 is seen in FIG. 3 as also displaying a discounted member price (see display lines 346 and 348). The discounted price may, for example, be negotiated by the MSA administrator (and a retail merchant) as a benefit to members, whereby eligible items may not only be conveniently paid out of the MSA account, but also purchased at a reduced price. Such an arrangement may be attractive to the retail merchant as an incentive for customers having MSA accounts to shop at that merchant's stores. It likewise is attractive to the MSA administrator, since it not only enhances the value of the MSA plan to its members, but also encourages members to purchase eligible products electronically (through use of the MSA card), and avoids significant administrative costs associated with processing paper reimbursement. Of course, the merchant could also choose to discount regular (non-eligible) purchases as well for customers using the MSA card, whether or not eligible products are purchased at the time of use.

It should be appreciated that information other than that seen in FIG. 3 could also be displayed on screen 310 (e.g., name of the member, his/her account number, the remaining balance in the MSA account, etc).

The screen in FIG. 3 can thus be seen as a convenient way to facilitate the purchase of MSA eligible products. The member need not know which items are eligible, but rather presents the MSA card and has information on eligibility displayed. The member also need not worry about the burden of later seeking reimbursement for eligible purchases, since it is handled electronically as part of the original purchase.

FIG. 4 illustrates in simplified form the content of two database tables within the database 122 (connected to the health network 116) and used in connection with POS terminal 102 (and screen 310 in FIG. 3) for facilitating the purchase of MSA eligible products. As seen there are two relational data base tables, a first table 410 containing various kinds of member information and a second table 412 containing various kinds of product information. The table 410 may include, as illustrated, an account number or ID associated with each member account. The account number is related to the current balance in the account available for making eligible purchases. While not specifically shown, other information may also be provided in connection with each account, such as a PIN (in the event required for accessing the account), member name, address, related accounts (the use of which will be described later), and any other personal information of the member useful in managing the account.

As also illustrated in FIG. 4, the table 412 stores product information such as a product ID for each product that is MSA eligible, whether a discount is offered ("Y/N") to members who purchase the product using their MSA account, and the amount (percentage) of the discount, if any, offered by the merchant. While not illustrated, other useful information concerning the product could also be stored for use in creating a POS display or otherwise facilitating MSA transactions (e.g., information on generic or store brand products equivalent to the eligible product being purchased and offering additional savings for the member, etc.).

As should be apparent, the database table 412 may be updated as needed, e.g., when product eligibility criteria are changed by the Internal Revenue Service or when new products meeting existing criteria are first made available for purchase at merchant locations. Further, there may be only one call or access to DBMS 120 (in order to verify the MSA account and its balance) during a transaction, since the product information (table 412) may be periodically downloaded to a local database (at retail network 104) and product eligibility queries handled locally at the POS terminals 102.

The functionality implementing the embodiments described in FIGS. 1 through 4 is largely data and applications resident at the POS terminals 102, and at the DBMS 120, depending on the configuration of the various devices with the system 100. A flow diagram illustrating the program steps implementing some embodiments of the invention is shown in FIG. 5.

Figure 5:
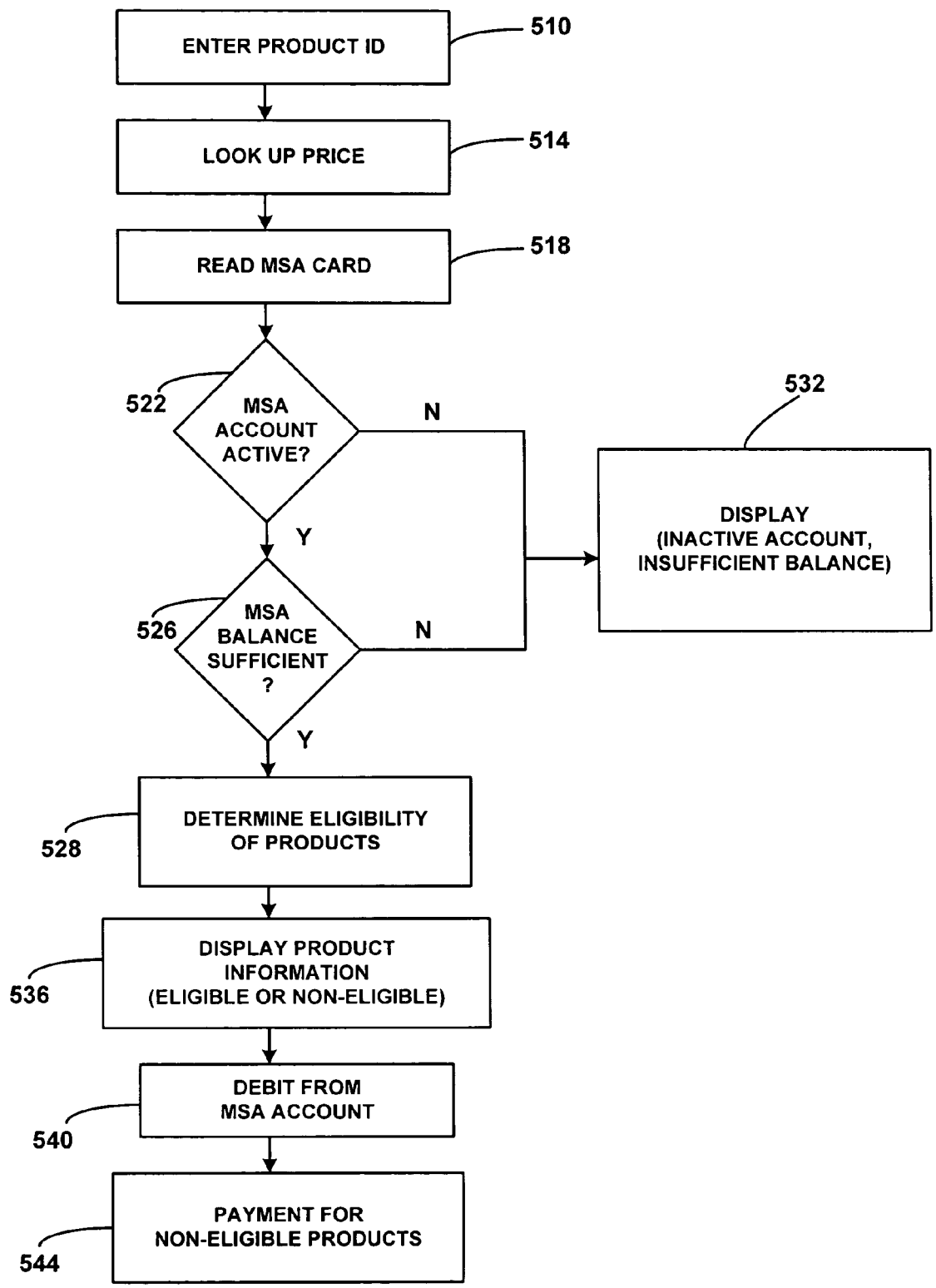
FIG. 5 is a flow diagram illustrating the operation of the system of FIG. 1.

Turning to FIG. 5, when the customer brings products to be purchased to the POS terminal 102, the product ID (e.g., from a bar code) is entered at the POS terminal, step 510, and the terminal accesses, step 514, a price-look up table (either at the POS terminal or within a data system elsewhere within retail network 104) in order to retrieve a price and, if desired, other information such as a product name, etc. The retrieved information is received at the POS terminal, and it may or may not at this point be displayed at the POS terminal, but if it is displayed, it will not yet reflect whether the product is eligible for MSA payment (since MSA information has not been entered). At step 518, MSA information is entered at the POS terminal, such as by reading the magnetic stripe 164 on the card 150. The transaction data (e.g., product ID) and the MSA account information (e.g., account number on the card 150) is sent through heath network 116 to the DBMS 120, so that the database 122 may confirm that the account is present and active (step 522) by comparing the MSA account number against account numbers or IDs in table 410, and may determine whether the balance in the MSA account is sufficient to cover the purchase of eligible products, step 526. If the account is not active or there is insufficient balance, information to that effect is displayed at the terminal 102, step 532. Next, DBMS 120 determines at step 528 which if any of the products being purchased are eligible for purchase under the MSA account by comparing products purchased against the product numbers or IDs in table 412.

If the account is active and has a sufficient balance, then the information in screen 310 seen in FIG. 3 is displayed at POS terminal 102, step 536, in order for the customer to see which products are MSA eligible. The customer elects whether to have the eligible products purchased through the MSA account, at step 540. The customer then handles the payment for non-eligible products (or eligible products not being purchased with the MSA account) at step 544, either by paying with cash or check, or using a separate credit or debit card.

It should be appreciated that the flow diagram in FIG. 5 is only one example of a process that could be carried out by application programs within the system 100. Additional steps may be performed, and the order of illustrated steps may be changed. For example, additional screens could be displayed to lead the customer/clerk through the transaction. Also, the MSA card could be presented and MSA information read before any product information is entered at the POS terminal.

It should be appreciated from the preceding discussion that the present invention provides a novel method and system for facilitating purchase of products or items, where items may be subject to or eligible for different payment treatment. While detailed descriptions of presently preferred embodiments of the invention have been given above, various alternatives, modifications, and equivalents will be apparent to those skilled in the art without varying from the spirit of the invention. Thus, while the described embodiments relate to separating eligible purchases from non-eligible purchases in conjunction with MSA accounts, the systems and methods of the present invention can be used in other environments where it may be desirable to separate purchased items according to payment treatment (e.g., a gift card/account that may be used to purchase items in a store, but excluding certain items such as alcohol or tobacco products—thus those products could separated from others for display and payment treatment). Further, while the MSA card 150 is described for use in purchasing MSA eligible products, it may also be used to facilitate the purchase of non-eligible products. For example, a separate credit card/debit card account could be associated with the MSA account (e.g., the associated account number is related to and stored with the MSA account number in table 410 of database 122), so that non-eligible products may be purchased using an associated credit card account at the same time that eligible items are purchased using the MSA account. In such case, when the MSA account is accessed, the related non-MSA account number may be retrieved and sent to the POS terminal, and used by the POS terminal to access the separate credit card account over the financial network 110. Thus the customer may avoid having to carry two cards, one for MSA purchases and a separate card for other purchases.

Further, the customer/MSA member need not carry a card. Rather the presentation instrument could be an RFID (radio frequency identification device) which is carried by the customer (e.g., as a key fob) and which electronically transmits MSA account information when passed near a transceiver at the POS terminal, so that the entire transaction can be conducted without presenting or reading/swiping a card. As a further example, the presentation instrument need not be a tangible instrument at all, but could be simply an identifier or password issued by the MSA administrator (e.g., string of characters) that a customer has memorized and that could be entered (along with an optional security code/PIN) at the POS terminal whenever a transaction is to be conducted.

Also, it should be appreciated that although the illustrated embodiments describe the sale (or purchase) of products, transactions may involve non-tangible items, such as services (e.g., medical treatment services). Further, the transaction need not be a sale, but could involve any form of retail/wholesale/commercial transaction, such as leasing or licensing. Thus, as used herein, the term "product" is intended to include (but not limited to) all transacted items (tangible and otherwise), and the terms "purchase" or "sale" are intended to include (but not limited to) all kinds of transactions.

Therefore, the described embodiments should not be taken as limiting the scope of the invention, which is defined by the appended claims.

What is claimed is:

1. A method for conducting a transaction involving the purchase of products at a POS terminal by a purchaser, wherein different products are subject to different payment treatments, the method comprising:

obtaining product information for each product being purchased at the POS terminal;

providing the product information from the POS terminal to a database system, wherein the database system relates payment treatment information to the product information of each product;

using the product information to retrieve payment treatment information for the product at the database system, so that in response to receiving the product information, payment treatment information is provided by the database system to the POS terminal; and purchasing the product based on its payment treatment;

wherein the POS terminal includes a display device, and wherein the payment treatment information is displayed at the display device;

wherein plural products have product information obtained at the POS terminal as part of a single transaction, wherein the product information and payment treatment information are separated and displayed on one screen at the display device according to payment treatment for the plural products having different payment treatments, and wherein the purchaser selects the payment treatment based on the payment treatment information displayed at the POS terminal.

2. The method of claim 1, wherein the payment treatment for at least one product is payment from a debit account.

3. The method of claim 2, wherein the debit account is a medical savings account.

4. The method of claim 2, further comprising obtaining debit account information at the POS terminal.

5. The method of claim 4, wherein debit account information is obtained from a debit card at the POS terminal.

6. The method of claim 1, wherein account information for a purchaser is obtained at the POS terminal, and wherein the account information is provided with the product information in order to retrieve payment treatment information for the product at the database system.

7. The method of claim 6, wherein the account information is obtained from a presentation instrument presented by the purchaser at the POS terminal.

8. The method of claim 7, wherein the presentation instrument is selected from a group consisting of a credit card, debit card, insurance card or RFID device, and wherein the presentation instrument is electronically read at the POS terminal.

9. The method of claim 1, wherein a plurality of the products purchased are subject to a single form of payment treatment with the form of payment treatment being payment from a medical savings account for products eligible for payment under such account.

10. The method of claim 1, wherein the payment treatment comprises at least two forms of payment, and wherein at least one form of payment is payment from a debit account, and wherein not all products are eligible for payment from the debit account.

11. The method of claim 10, wherein the debit account is a medical savings account.

12. The method of claim 10, wherein a second form of payment is selected from a group consisting of cash, a check, a credit account or a second debit account.

13. The method of claim 10, wherein a second form of payment is from a second account, and wherein the database system is configured to relate the second account to the debit account in the database system.

14. The method of claim 10, wherein the payment treatment further comprises a payment discount applied to the product if the product is eligible for payment from the debit account.

15. A system for conducting a sales transaction for products at a merchant location, wherein different products are eligible for different forms of payment, the system comprising:

a POS terminal at the merchant location that obtains product information on each product being sold;

a data system that receives the product information and that determines the payment form for which the product is eligible, and that provides payment form information to the POS terminal for each product; and a display at the POS terminal that displays the payment form information and the product information, the payment form information and the product information separated and displayed according to payment form when the plural products have different forms of payment as part of a single transaction;

wherein the payment form information is used at the POS terminal in settling the sales transaction, and wherein a purchaser selects the payment form based on the displayed payment form information.

16. The system of claim 15, wherein the data system comprises a database system, the database system relating payment form information to product information for each product, so that in response to receiving the product information, payment form information is provided by the database system.

17. The system of claim 16, wherein product information is a product ID and the product ID is provided by the POS terminal to the database system.

18. The system of claim 17, wherein the payment form for at least one product comprises payment from a debit account.

19. The system of claim 18, wherein the debit account is a medical savings account.

20. The system of claim 18, wherein the POS terminal obtains debit account information.

21. The system of claim 18, further comprising a card reader at the POS terminal for reading debit account information from a debit card, and wherein payment form information is retrieved from the database system in response to receiving both the product ID and the debit account information.

22. The system of claim 21, wherein the payment form information for the one product further comprises a discount for the product when the payment treatment is payment from a medical savings account.

23. A system for conducting transactions for items at a merchant location, wherein different items are eligible for different forms of payment, the system comprising:

POS means at the merchant location for obtaining ID information on each item being sold; and data system means for receiving the ID information and determining the payment form for which the item is eligible, and for providing payment form information to the POS means for each item;

display means at the POS means for displaying the payment form information and the item information, the payment form information and the item information separated and displayed according to payment form when the plural items have different forms of payment as part of a single transaction;

wherein the payment form information is used at the POS means in settling the transaction, and wherein a purchaser selects the payment form based on the displayed payment form information.

* * * * *